United States Patent
Borse et al.

(10) Patent No.: US 11,827,725 B2
(45) Date of Patent: Nov. 28, 2023

(54) MULTIMODAL POLYETHYLENE COMPOSITION

(71) Applicant: Univation Technologies, LLC, Houston, TX (US)

(72) Inventors: Nitin Borse, Pearland, TX (US); Swapnil B. Chandak, Pearland, TX (US); Yi Zhang, Hopkinton, MA (US); Timothy R. Lynn, Glen Gardner, NJ (US); Roger L Kuhlman, Lake Jackson, TX (US); John F. Szul, Hurricane, WV (US)

(73) Assignee: Univation Technologies LLC, Houston, TX (US)

( * ) Notice: Subject to any disclaimer, the term of this patent is extended or adjusted under 35 U.S.C. 154(b) by 680 days.

(21) Appl. No.: 16/976,497

(22) PCT Filed: Mar. 22, 2019

(86) PCT No.: PCT/US2019/023500
§ 371 (c)(1),
(2) Date: Aug. 28, 2020

(87) PCT Pub. No.: WO2019/190898
PCT Pub. Date: Oct. 3, 2019

(65) Prior Publication Data
US 2021/0040249 A1 Feb. 11, 2021

Related U.S. Application Data

(60) Provisional application No. 62/649,077, filed on Mar. 28, 2018.

(51) Int. Cl.
| | |
|---|---|
| *C08F 210/02* | (2006.01) |
| *B29C 45/00* | (2006.01) |
| *C08F 2/34* | (2006.01) |
| *C08F 4/64* | (2006.01) |
| *C08F 4/659* | (2006.01) |
| *C08F 4/6592* | (2006.01) |
| *C08F 210/04* | (2006.01) |
| *C08F 210/14* | (2006.01) |
| *B29L 31/56* | (2006.01) |

(52) U.S. Cl.
CPC ........ *C08F 210/02* (2013.01); *B29C 45/0001* (2013.01); *C08F 2/34* (2013.01); *C08F 4/64148* (2013.01); *C08F 4/65904* (2013.01); *C08F 4/65925* (2013.01); *C08F 210/04* (2013.01); *C08F 210/14* (2013.01); *B29L 2031/565* (2013.01)

(58) Field of Classification Search
CPC ...... C08F 210/02; C08F 2/34; C08F 4/65916; C08L 2205/025
See application file for complete search history.

(56) References Cited

U.S. PATENT DOCUMENTS

| | | | |
|---|---|---|---|
| 7,250,473 B2 | 7/2007 | Schramm et al. | |
| 7,576,166 B2 | 8/2009 | Aarila et al. | |
| 7,897,710 B2 | 3/2011 | Amos et al. | |
| 8,008,403 B2 | 8/2011 | Kipke et al. | |
| 8,476,370 B2 | 7/2013 | Backman et al. | |
| 8,627,840 B2 | 1/2014 | Belloir et al. | |
| 8,846,188 B2 | 9/2014 | Fantinel et al. | |
| 8,957,158 B2 | 2/2015 | Fantinel et al. | |
| 9,017,784 B2 | 4/2015 | Palmlof et al. | |
| 9,090,762 B2 | 7/2015 | Kipke et al. | |
| 9,249,286 B2 | 2/2016 | Joseph | |
| 9,284,389 B2 | 3/2016 | St. Jean et al. | |
| 9,309,338 B2 | 4/2016 | St. Jean et al. | |
| 10,941,284 B2 * | 3/2021 | Chandak | C08F 4/64148 |
| 11,142,597 B2 * | 10/2021 | Chandak | C08L 23/0815 |
| 11,203,653 B2 * | 12/2021 | Borse | C08F 4/65912 |
| 2004/0266966 A1 | 12/2004 | Schramm et al. | |
| 2005/0054790 A1 | 3/2005 | Mawson et al. | |
| 2007/0007680 A1 | 1/2007 | Henri Barre et al. | |
| 2008/0312380 A1 | 12/2008 | Kwalk et al. | |
| 2010/0084363 A1 | 4/2010 | Michie, Jr. et al. | |
| 2014/0242314 A1 | 8/2014 | Inn et al. | |
| 2015/0017365 A1 | 1/2015 | Sohn et al. | |
| 2015/0274947 A1 | 10/2015 | Vittorias et al. | |

FOREIGN PATENT DOCUMENTS

| | | |
|---|---|---|
| CA | 2427685 | 6/2002 |
| WO | 03/016396 | 2/2003 |
| WO | 2004101674 | 11/2004 |
| WO | 2006/045738 | 5/2006 |
| WO | 2010/000557 | 1/2010 |
| WO | 2015/055392 | 4/2015 |
| WO | 2015/069637 | 5/2015 |
| WO | 2019/046085 | 3/2019 |
| WO | 2019/051006 | 3/2019 |

OTHER PUBLICATIONS

PCT/US2019/023500, International Search Report and Written Opinion dated Jun. 17, 2019.

* cited by examiner

*Primary Examiner* — Jeffrey C Mullis

(57) ABSTRACT

A bimodal polyethylene composition, products made therefrom, methods of making and using same, and articles, including bottle caps and closures, containing same.

8 Claims, 2 Drawing Sheets

MULTIMODAL POLYETHYLENE COMPOSITION

FIELD

The field includes polyethylene compositions, products made therefrom, methods of making and using same, and articles containing same.

INTRODUCTION

Patent application publications in the Field include CA 2427685 A1; EP 3058002A1; US 2004/0266966 A1; US 2005/0054790 A1; US 2007/0007680 A1; US 2010/0084363 A1; US 2014/0242314 A1; US 2015/0017365 A1; US 2015/0274947 A1; WO 2003/016396 A1; WO 2004/101674 A1; WO 2006/045738 A1; WO 2010/000557 A2; WO 2015/055392 A1; and WO 2015/069637 A2. Patents in the Field include EP 2285843 B1; U.S. Pat. Nos. 7,250,473 B2; 7,576,166 B2; 7,897,710 B2; 8,008,403 B2; 8,476,370 B2; 8,627,840 B2; 8,846,188 B2; 8,957,158 B2; 9,017,784 B2; 9,090,762 B2; 9,249,286 B2; 9,284,389 B2; and 9,309,338 B2.

Polyethylene polymers have numerous commercial applications. These include films, sheets, injection molded articles, and extruded articles. The films and sheets are used in packaging applications and non-packaging applications. Examples are agricultural film, food packaging, garment bags, grocery bags, heavy-duty sacks, industrial sheeting, pallet and shrink wraps, and bags. The injection molded articles include buckets, freezer containers, lids, and toys. The extruded articles include pipes and coating layers of electrical cables.

US 2004/0266966 A1 relates to a multimodal polyolefin pipe. WO 2004/101674 A1 relates to a polymer composition and process to manufacture high molecular weight-high density polyethylene and film therefrom. US 2010/0084363 A1 relates to high-density polyethylene compositions, method of making the same, injection molded articles made therefrom, and method of making such articles, which include a wire cable jacketing, a conduit pipe, an injection blow molded bottle, and a bottle cap closure.

SUMMARY

We provide a bimodal polyethylene composition ("inventive bimodal PE composition") made with a bimodal catalyst system, products made therefrom, methods of making and using same, and articles containing same. The inventive bimodal polyethylene composition has properties that enable it to be used to make a bottle cap or closure.

The inventive bimodal PE composition also may be used in other applications.

DETAILED DESCRIPTION

Figure 1:
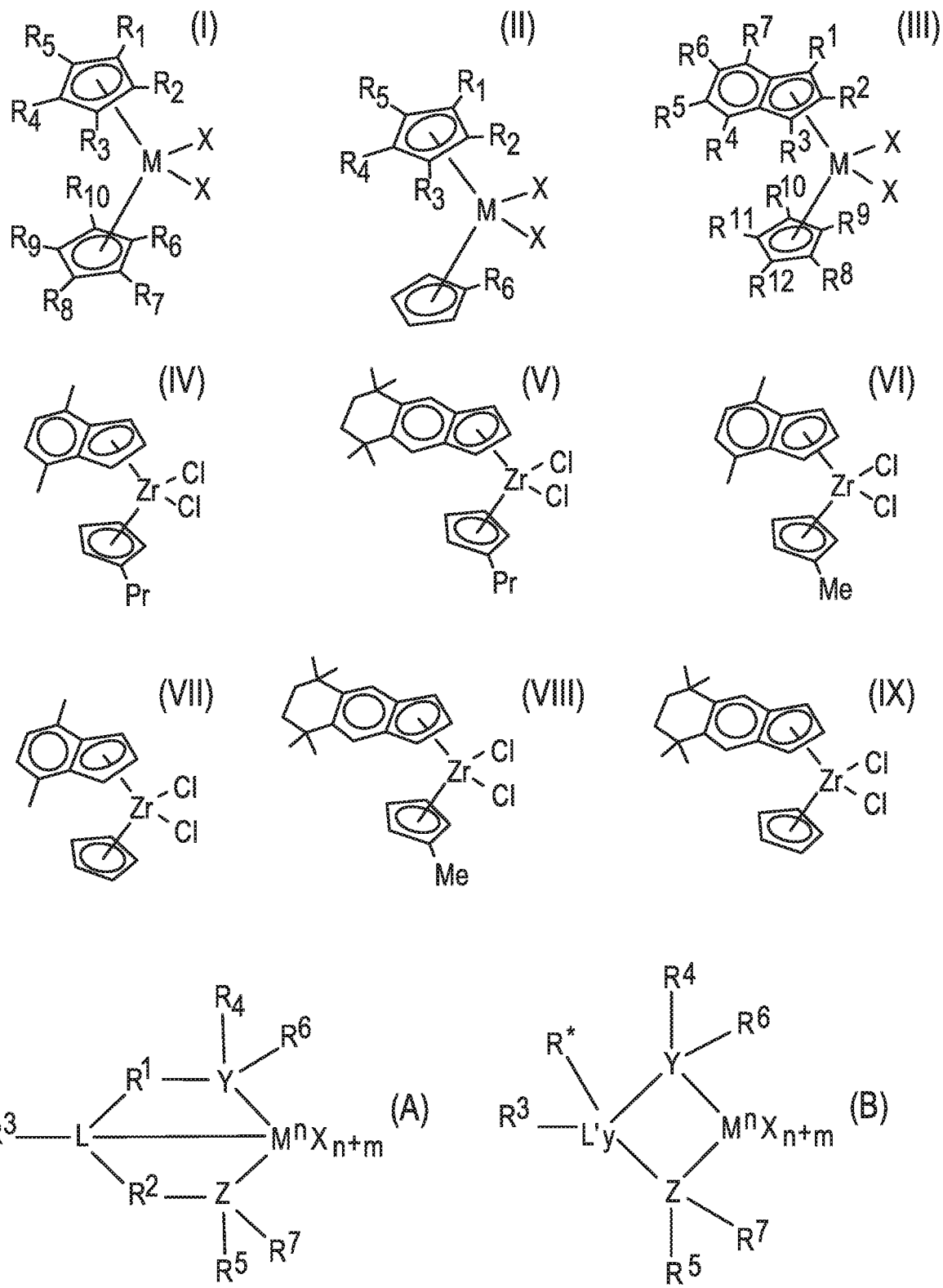
FIG. 1 contains drawings of structural formulas of (pro) catalysts.

The Summary and Abstract are incorporated here by reference.

Certain inventive embodiments are described below as numbered aspects for easy cross-referencing. Additional embodiments are described elsewhere herein.

Aspect 1. A bimodal polyethylene composition comprising a lower molecular weight (LMW) polyethylene component and a higher molecular weight (HMW) polyethylene component, wherein each of the LMW and HMW polyethylene components comprises ethylene-derived monomeric units and $(C_3-C_{20})$alpha-olefin-derived comonomeric units; and wherein the bimodal polyethylene composition is characterized by each of limitations (a) to (e): (a) a resolved bimodality (resolved molecular weight distribution) showing in a chromatogram of gel permeation chromatography (GPC) of the bimodal polyethylene composition, wherein the chromatogram shows a peak representing the HMW polyethylene component, a peak representing the LMW polyethylene component, and a local minimum in a range of Log(molecular weight) ("Log(MW)") 3.5 to 5.5, alternatively 4.0 to 5.2, alternatively 4.6 to 4.9 between the Log(MW) peak representing the HMW polyethylene component and the Log(MW) peak representing the LMW polyethylene component, measured according to Bimodality Test Method, described later; (b) a density from 0.950 to 0.960 g/cm$^3$, alternatively 0.951 to 0.959 g/cm$^3$, alternatively 0.952 to 0.958 g/cm$^3$, alternatively 0.954 to 0.956 g/cm$^3$, measured according to ASTM D792-13 Method B; (c) a melt index ($I_2$) of from 0.5 to 1.5 g/10 min., alternatively 0.50 to 1.20 g/10 min., alternatively 0.51 to 1.10 g/10 min. measured according to ASTM D1238-13 (190° C., 2.16 kg); (d) a melt flow ratio ($I_{21}/I_2$) of from 150 to 300, alternatively from 175 to 295, alternatively from 195 to 285, alternatively from 220 to 279 wherein $I_2$ is measured as above and $I_{21}$ is flow index measured according to ASTM D1238-13 (190° C., 21.6 kg); (e) a flow index ($I_5$) from 2.0 to 10.0 g/10 min., alternatively from 2.5 to 8.0 g/10 min., alternatively from 2.8 to 7.5 g/10 min. measured according to ASTM D1238-13 (190° C., 5.0 kg); and wherein the HMW polyethylene component of the bimodal polyethylene composition is characterized by limitations (f) and (g): (f) a weight-average molecular weight (Mw) of greater than 350,000 grams per mole (g/mol), alternatively from 400,000 to 550,000 g/mol, alternatively from 470,000 to 520,000 g/mol as measured by Gel Permeation Chromatography Method (described later); and (g) a molecular mass dispersity, Đ$_M$, (Mw/Mn) greater than 3.50, alternatively from 3.80 to 4.50, alternatively from 3.90 to 4.10.

Aspect 2. The bimodal PE composition of aspect 1 further described by any one of limitations (i) to (vi): (i) a spiral flow length of from 25 to 40 centimeters (cm) measured at 68.95 megapascals (MPa), a spiral flow length from 30 to 60 cm measured at 103.4 MPa, and/or a spiral flow length from 40 to 70 cm measured at 137.9 MPa according to the Spiral Flow Length Test Method, described later; (ii) an environmental stress crack resistance (ESCR) F50 measured according to ASTM D1693-15 in 10 weight percent (wt %) Igepal CO-630 in water at 50° C. of greater than 500 hours, alternatively greater than 700 hours, alternatively greater than 1,000 hours, and in some aspects at most 10,000 hours; (iii) a shrinkage from melt to solid form of from 3.0% to 5.0%, alternatively 3.0% to 4.5% in flow direction and/or a shrinkage from melt to solid form of from 0.2% to 1.5% in cross-flow direction, measured according to ASTM D-955 utilizing a 60 mm×60 mm×2 mm plaques; (iv) an oxidative induction time (OIT) of greater than 40 minutes, alternatively greater than 50 minutes, alternatively greater than 60 minutes, alternatively from 60.0 to 70 minutes at 210° C. as measured by differential scanning calorimetry (DSC)

according to OIT Test Method described later; (v) at least two of (i) to (iv); (vi) each of (i) to (iv).

Aspect 3. The bimodal PE composition of aspect 1 further described by any one of limitations (i) to (vii): (i) a molecular mass dispersity ($M_w/M_n$), $Đ_M$ (pronounced D-stroke M), from 15 to 30, alternatively from 17 to 25, alternatively from 19 to 22, measured according to Gel Permeation Chromatography (GPC) Test Method, described later; (ii) a weight average molecular weight ($M_n$) of the LMW polyethylene component from 4,000 to 6,000 g/mol, alternatively from 4,800 to 5,400 g/mol, alternatively from 5,001 to 5,199 g/mol and a $M_n$ of the HMW polyethylene component from 110,000 to 130,000 g/mol alternatively from 116,000 to 126,000 g/mol, alternatively from 120,001 to 122,500 g/mol, measured according to GPC Test Method, described later, after deconvoluting the LMW and HMW polyethylene components of the bimodal PE composition according to Deconvoluting Test Method, described later; (iii) no measurable, alternatively no detectable, amount of long chain branching per 1,000 carbon atoms ("LCB Index"), measured according to LCB Test Method (described later); (iv) both (i) and (ii); (v) both (i) and (iii); (vi) both (ii) and (iii); and (vii) each of (i) to (iii).

Aspect 4. The bimodal PE composition of any one of aspects 1 to 3 further described by any one of limitations (i) to (iv): (i) the ($C_3$-$C_{20}$)alpha-olefin-derived comonomeric units are derived from 1-butene; (ii) the ($C_3$-$C_{20}$)alpha-olefin-derived comonomeric units are derived from 1-hexene; (iii) the ($C_3$-$C_{20}$)alpha-olefin-derived comonomeric units are derived from 1-octene; and (iv) the ($C_3$-$C_{20}$)alpha-olefin-derived comonomeric units are derived from a combination of any two, alternatively each of 1-butene, 1-hexene, and 1-octene.

Aspect 5. A bimodal polyethylene composition made by copolymerizing ethylene (monomer) and at least one ($C_3$-$C_{20}$)alpha-olefin (comonomer) with a mixture of a bimodal catalyst system and a trim solution in the presence of molecular hydrogen gas ($H_2$) and, optionally, an induced condensing agent (ICA) in one, two or more polymerization reactors (e.g., one fluidized bed gas phase reactor) under (co)polymerizing conditions; wherein prior to being mixed together the trim solution consists essentially of a (tetramethylcyclopentadienyl)(n-propylcyclopentadienyl)zirconium complex (procatalyst, e.g., (tetramethylcyclopentadienyl)(n-propylcyclopentadienyl)zirconium dim ethyl) and an inert liquid solvent (e.g., liquid alkane) and the bimodal catalyst system consists essentially of an activator species (derivative, e.g., a methylaluminoxane species), a bis(2-pentamethylphenylamido)ethyl)amine zirconium complex and a (tetramethylcyclopentadienyl)(n-propylcyclopentadienyl)zirconium complex, all disposed on a solid support (e.g., a hydrophobic fumed silica); and wherein the (co)polymerizing conditions comprise a reaction temperature from 80 degrees (°) to 110° Celsius (C.), alternatively 83° to 106° C., alternatively 83° to 87° C., alternatively 91° to 100° C., alternatively 101° to 106° C.; a molar ratio of the molecular hydrogen gas to the ethylene (H2/C2 molar ratio) from 0.001 to 0.020, alternatively 0.002 to 0.015, alternatively 0.005 to 0.010; and a molar ratio of the comonomer (Comer) to the ethylene (Comer/C2 molar ratio) from 0.005 to 0.050, alternatively 0.008 to 0.030, alternatively 0.015 to 0.025. The bimodal PE composition may be that of any one of aspects 1 to 4.

Aspect 6. A method of making a bimodal polyethylene composition, the method comprising contacting ethylene (monomer) and at least one ($C_3$-$C_{20}$)alpha-olefin (comonomer) with a mixture of a bimodal catalyst system and a trim solution in the presence of molecular hydrogen gas ($H_2$) and, optionally, an induced condensing agent (ICA) in one, two or more polymerization reactors under (co)polymerizing conditions, thereby making the bimodal polyethylene composition; wherein prior to being mixed together the trim solution consists essentially of a (tetramethylcyclopentadienyl)(n-propylcyclopentadienyl)zirconium complex (procatalyst, e.g., (tetramethylcyclopentadienyl)(n-propylcyclopentadienyl)zirconium dimethyl) and an inert liquid solvent (e.g., liquid alkane) and the bimodal catalyst system consists essentially of an activator species (derivative, e.g., a methylaluminoxane species), a non-metallocene ligand-Group 4 metal complex (e.g., bis(2-pentamethylphenylamido)ethyl) amine zirconium complex) and a metallocene ligand-Group 4 metal complex (e.g., (tetramethylcyclopentadienyl)(n-propylcyclopentadienyl)zirconium complex), all disposed on a solid support (e.g., a hydrophobic fumed silica); and wherein the (co)polymerizing conditions comprise a reaction temperature from 80° to 110° C., alternatively 83° to 106° C., alternatively 83° to 87° C., alternatively 91° to 100° C., alternatively 101° to 106° C.; a molar ratio of the molecular hydrogen gas to the ethylene (H2/C2 molar ratio) from 0.001 to 0.050, alternatively 0.001 to 0.030, alternatively 0.002 to 0.025, alternatively 0.010 to 0.020; and a molar ratio of the comonomer (Comer) to the ethylene (Comer/C2 molar ratio) from 0.005 to 0.10, alternatively 0.008 to 0.050, alternatively 0.010 to 0.040 alternatively 0.008 to 0.030, alternatively 0.015 to 0.025. The bimodal PE composition may be that of any one of aspects 1 to 5. Alternatively in aspect 5 or 6, the bimodal catalyst system may be prepared, and then fed into the polymerization reactor(s) as a suspension (e.g., slurry) in a mineral oil and the trim solution may be prepared, and then fed into the polymerization reactor(s) as a solution, e.g., in a liquid alkane.

Aspect 7. The bimodal polyethylene composition of aspect 5 or the method of aspect 6 may be further described by any one of limitations (i) to (vi): (i) wherein the bimodal catalyst system consists essentially of a bis(2-pentamethylphenylamido)ethyl)amine zirconium complex and a (tetramethylcyclopentadienyl)(n-propylcyclopentadienyl)zirconium complex in a molar ratio thereof from 1.0:1.0 to 5.0:1.0, respectively, alternatively 1.5:1.0 to 2.5:1.0, alternatively 2.0:1.0 to 4.0:1.0, 2.5:1.0 to 3.49:1.0, alternatively from 2.7:1.0 to 3.3:1.0, alternatively from 2.9:1.0 to 3.1:1.0, alternatively 1.5:1.0, alternatively 2.0:1.0, and a methylaluminoxane species, all disposed by spray-drying onto the solid support; (ii) wherein the bimodal catalyst system further consists essentially of mineral oil and the solid support is a hydrophobic fumed silica (e.g., a fumed silica treated with dimethyldichlorosilane); (iii) wherein the mixture is a suspension of the bimodal catalyst system in mineral oil and the trim solution and wherein the mixture is premade and then fed into the polymerization reactor(s); (iv) wherein the trim solution is made by dissolving (tetramethylcyclopentadienyl)(n-propylcyclopentadienyl)zirconium dimethyl in the inert liquid solvent (e.g., liquid alkane) to give the trim solution; (v) wherein the polymerization reactor(s) is one fluidized bed gas phase reactor and the method is a gas phase polymerization; and (vi) each of (i) to (v). The molar ratio of the bis(2-pentamethylphenylamido)ethyl) amine zirconium complex to the (tetramethylcyclopentadienyl)(n-propylcyclopentadienyl)zirconium complex may be based on molar ratio of their respective Zr atom contents, which may be calculated from ingredient weights (e.g., weights of bis(2-pentamethylphenylamido)ethyl)amine zirconium dibenzyl and (tetramethylcyclopentadienyl)(n-propylcyclopentadienyl)zirconium dichloride) or may be analytically measured.

Aspect 8. A manufactured article comprising a shaped form of the bimodal polyethylene composition of any one of aspects 1 to 5.

Aspect 9. The manufactured article of aspect 8 selected from: coatings, films, sheets, extruded articles, and injection molded articles. The manufactured article may be a coating layer (e.g., of a coated article), pipe, film (e.g., blown film), agricultural film, food packaging, garment bags, grocery bags, heavy-duty sacks, industrial sheeting, pallet and shrink wraps, bags, buckets, freezer containers, lids, and toys.

Aspect 10 A bottle cap or closure comprising a base member and a skirt member, the base member defining a perimeter edge therearound, and the skirt member being in operative connection to the perimeter edge of the base member and extending axially from the perimeter of the base member; wherein the skirt member defines an inner surface; wherein the base member being for sealing a bottle opening of a bottle and the skirt member being for operatively attaching the bottle cap or closure to an exterior cap-or-closure-receiving portion of the bottle proximate the bottle opening, wherein at least one of the base member and skirt member of the bottle cap or closure is composed of the bimodal polyethylene composition of any one of aspects 1 to 5. The bottle cap or closure is movable from a closed position to an open position when attached to the bottle, and may be movable from the open position to the closed position. The inner surface of the skirt member of the bottle cap or closure forms a seal against the exterior cap-or-closure-receiving portion of the bottle so as to contain the contents of the bottle therein when the bottle cap or closure is affixed to the bottle and in a closed position on the bottle. In some aspects the base member is free of an aperture therein, alternatively the base member defines an aperture therein, wherein the aperture may be closed or open. In some aspects the inner surface of the skirt member defines a screw-threaded portion of the skirt member, wherein the screw-threaded portion is configured to screw onto a complementary screw-threaded exterior cap-or-closure-receiving portion of the bottle. In some aspects the inner surface of the skirt member is not screw-threaded but defines a latching portion for snap-fitting onto a complementary designed exterior cap-or-closure-receiving portion of the bottle. In some aspects the bottle cap or closure further comprises the bottle. The bottle may be a plastic carbonated beverage bottle and the bottle cap or closure may be a bottle cap. The bottle cap may be a condiment bottle, and the bottle cap or closure may be a closure for sealing the condiment bottle. In some aspects the bottle cap or closure further comprises a lid member that is different than the base and skirt members. The lid member may be composed of the bimodal polyethylene composition of any one of aspects 1 to 5. The base member of the bottle cap or closure containing the lid member may define an aperture in the base member, wherein the lid member may be movable from a closed position to an open position such that a bottle having the embodiment of the bottle closure having the lid member attached thereto may be a squeeze bottle, wherein contents of the squeeze bottle may be contained in the squeeze bottle when the lid member of the bottle closure is in the closed position and wherein the contents of the squeeze bottle may be expressed out of the squeeze bottle via the aperture in the base member of the bottle closure when the lid member of the bottle closure is in the open position.

The bottle cap or closure is made by any suitable technique, including injection molding. In an example of the injection molding process, the inventive bimodal polyethylene composition is fed as pellets or powder into an extruder via a hopper. The extruder conveys, heats, melts, and pressurizes the composition to a form a molten stream thereof. The molten stream is forced out of the extruder through a nozzle into a relatively cool mold held closed under pressure, thereby filling the mold. The melt cools and hardens until fully set-up in the mold. The mold is then opened, and the molded article, e.g. bottle cap or closure, is removed therefrom. The resulting injection molded bottle cap or closure can close or seal a bottle. When the inner surface of the skirt member of the bottle cap or closure contains the screw-threading, the bottle cap or closure may be screwed onto the screw-threaded exterior cap-or-closure-receiving portion of the bottle. To unseal the bottle, the bottle cap or closure may be unscrewed therefrom. The screwing and unscrewing may be performed by a machine or a person.

The bimodal polyethylene composition may further comprise a pigment to color the composition. The color may be natural, white, red, blue, yellow, or green.

Activator (for activating procatalysts to form catalysts). Also known as co-catalyst. Any metal containing compound, material or combination of compounds and/or substances, whether unsupported or supported on a support material, that can activate a procatalyst to give a catalyst and an activator species. The activating may comprise, for example, abstracting at least one leaving group (e.g., at least one X in any one of the structural formulas in FIG. 1) from a metal of a procatalyst (e.g., M in any one of the structural formulas in FIG. 1) to give the catalyst. The catalyst may be generically named by replacing the leaving group portion of the name of the procatalyst with "complex". For example, a catalyst made by activating bis(2-pentamethylphenylamido) ethyl)amine zirconium dibenzyl may be called a "bis(2-pentamethylphenylamido)ethyl)amine zirconium complex". A catalyst made by activating (tetramethylcyclopentadienyl) (n-propylcyclopentadienyl)zirconium dichloride or (tetramethylcyclopentadienyl)(n-propylcyclopentadienyl)zirconium dimethyl may be called a "(tetramethylcyclopentadienyl)(n-propylcyclopentadienyl) zirconium complex". The catalyst made by activating (tetramethylcyclopentadienyl)(n-propylcyclopentadienyl)zirconium dichloride may be the same as or different than the catalyst made by activating (tetramethylcyclopentadienyl) (n-propylcyclopentadienyl)zirconium dimethyl. The metal of the activator typically is different than the metal of the procatalyst. The molar ratio of metal content of the activator to metal content of the procatalyst(s) may be from 1000:1 to 0.5:1, alternatively 300:1 to 1:1, alternatively 150:1 to 1:1. The activator may be a Lewis acid, a non-coordinating ionic activator, or an ionizing activator, or a Lewis base, an alkylaluminum, or an alkylaluminoxane. The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, triisobutylaluminum, and the like. The alkylaluminum halide may be diethylaluminum chloride. The alkylaluminoxane may be a methyl aluminoxane (MAO), ethyl aluminoxane, or isobutylaluminoxane. The activator may be a MAO that is a modified methylaluminoxane (MMAO). The corresponding activator species may be a derivative of the Lewis acid, non-coordinating ionic activator, ionizing activator, Lewis base, alkylaluminum, or alkylaluminoxane, respectively. The activator species may have a different structure or composition than the activator from which it is derived and may be a by-product of the activation of the procatalyst or a derivative of the byproduct. An example of the derivative of the byproduct is a methylaluminoxane species that is formed by devolatilizing during spray-drying of a bimodal catalyst system made with methylaluminoxane. The activator may be commercially available. An activator may be fed into the polymerization reactor(s) (e.g., one fluidized bed gas phase reactor) in a separate feed from that feeding the reactants used to make the bimodal catalyst system (e.g., supported bimodal catalyst system) and/or the trim solution thereinto. The activator may be fed into the polymerization reactor(s) in "wet mode" in the form of a solution thereof in an inert liquid such as mineral oil or toluene, in slurry mode as a suspension, or in dry mode as a powder.

Bimodal. Multimodal; having at least 2 peaks, (e.g., 2 or 3 peaks), alternatively only 2 peaks, in a molecular weight distribution (MWD) such as MWD measured by gel permeation chromatography (GPC).

Bimodal catalyst system. A combination of two or more catalyst compounds independently useful for enhancing rate of polymerization of a same olefin monomer and/or comonomer and yields a bimodal polyethylene composition. In some aspects the bimodal catalyst system has only two catalysts, and is prepared from two and only two procatalyst compounds. One of the catalyst compounds may be a metallocene catalyst compound and the other a non-metallocene catalyst compound. One of the catalyst compounds yields, under the (co)polymerizing conditions, the lower molecular weight (LMW) polyethylene component and the other catalyst compound yields the higher molecular weight (HMW) polyethylene component. The LMW and HMW polyethylene components together constitute the bimodal polyethylene composition, which may be the inventive PE composition, made with the bimodal catalyst system, and having a multimodal (e.g., bimodal) molecular weight distribution. Typically the bimodal catalyst system, method employing same, and inventive bimodal PE composition is free of a Ziegler-Natta catalyst.

The bimodal catalyst system may be made by contacting at least two procatalysts having different structures from each other with at least one of the activators. Each procatalyst may independently comprise a metal atom, at least one ligand bonded to the metal atom, and at least one leaving group bonded to and displaceable from the metal atom. Each metal may be an element of any one of Groups 3 to 14, e.g., a Group 4 metal. Each leaving group is H, an unsubstituted alkyl, an aryl group, an aralkyl group, a halide atom, an alkoxy group, or a primary or secondary amino group. In metallocenes, at least one ligand is a cyclopentadienyl or substituted cyclopentadienyl group. In non-metallocenes, no ligand is a cyclopentadienyl or substituted cyclopentadienyl group, and instead at least one ligand has at least one O, N, and/or P atom that coordinates to the metal atom. Typically the ligand(s) of the non-metallocene has at least two O, N, and/or P atoms that coordinates in a multidentate (e.g., bidentate or tridentate) binding mode to the metal atom. Discrete structures means the procatalysts and catalysts made therefrom have different ligands from each other, and either the same or a different metal atom, and either the same or different leaving groups.

One of the procatalysts, useful for making a catalyst of the bimodal catalyst system and/or making the trim solution, may be a metallocene compound of any one of formulas (I) to (IX) and another of the procatalysts may be a non-metallocene of any one of formulas (A) and (B), wherein the formulas are drawn in FIG. 1.

In formula (I), FIG. 1, each of the $R^1$ to $R^{10}$ groups is independently H, a $(C_1$-$C_{20})$alkyl, $(C_6$-$C_{20})$aryl, or $(C_7$-$C_{20})$ aralkyl group; M is a Group 4 metal; and each X is independently H, a halide, $(C_1$-$C_{20})$alkyl, or $(C_7$-$C_{20})$aralkyl group. In some aspects each of $R^7$ to $R^{10}$ is H in formula (I).

In formula (II), FIG. 1, each of the $R^1$ to $R^6$ groups is independently H, a $(C_1$-$C_{20})$alkyl, $(C_6$-$C_{20})$aryl, or $(C_7$-$C_{20})$ aralkyl group; M is a Group 4 metal (e.g., Ti, Zr, or Hf); and each X is independently H, a halide, $(C_1$-$C_{20})$alkyl, or $(C_7$-$C_{20})$aralkyl group.

In formula (III), FIG. 1, each of the $R^1$ to $R^{12}$ groups is independently H, a $(C_1$-$C_{20})$alkyl, $(C_6$-$C_{20})$aryl, or $(C_7$-$C_{20})$ aralkyl group, wherein at least one of $R^4$ to $R^7$ is not H; M is a Group 4 metal (e.g., Ti, Zr, or Hf); and each X is independently H, a halide, $(C_1$-$C_{20})$alkyl, or $(C_7$-$C_{20})$aralkyl group. In some aspects each of $R^9$ to $R^{12}$ is H in formula (III).

In some aspects each X in formulas (I) to (III) is independently a halide, $(C_1$-$C_4)$alkyl, or benzyl; alternatively Cl or benzyl. In some aspects each halide in formulas (I) to (III) is independently Cl, Br, or I; alternatively Cl or Br; alternatively Cl. In some aspects each M in formulas (I) to (III) is independently Ti, Zr, or Hf; alternatively Zr or Hf; alternatively Ti; alternatively Zr; alternatively Hf.

In formulas (IV) to (IX), FIG. 1, Me is methyl ($CH_3$), Pr is propyl (i.e., $CH_2CH_2CH_3$), and each "I" substituent on a ring represents a methyl group.

In formulas (A) and (B), FIG. 1, M is a Group 3 to 12 transition metal atom or a Group 13 or 14 main group metal atom, or a Group 4, 5, or 6 metal atom. M may be a Group 4 metal atom, alternatively Ti, Zr, or Hf; alternatively Zr or Hf; alternatively Zr. Each X is independently a leaving group as described above, such as an anionic leaving group. Subscript y is 0 or 1; when y is 0 group L' is absent. Subscript n represents the formal oxidation state of metal atom M and is +3, +4, or +5; alternatively n is +4. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus; alternatively nitrogen. Z is a Group 15 element, such as nitrogen or phosphorus; alternatively nitrogen. Subscript m is 0, −1, −2 or −3; alternatively −2; and represents the total formal charge of the Y, Z, and L in formula (A) and the total formal charge of the Y, Z, and L' in formula (B). $R^1$, $R^2$, $R^3$, $R^4$, $R^5$, $R^6$, and $R^7$ are independently H, a $(C_1$-$C_{20})$hydrocarbyl group, a $(C_1$-$C_{20})$ heterohydrocarbyl group, or a $(C_1$-$C_{20})$organoheteryl group, wherein the $(C_1$-$C_{20})$heterohydrocarbyl group and $(C_1$-$C_{20})$ organoheteryl group each independently have at least one heteroatom selected from Si, Ge, Sn, Pb, or P. Alternatively, $R^1$ and $R^2$ are covalently bonded to each other to form a divalent group of formula —$R^{1a}$-$R^{2a}$— and/or $R^4$ and $R^5$ are covalently bonded to each other to form a divalent group of formula —$R^{4a}$-$R^{5a}$—, wherein —$R^{1a}$-$R^{2a}$— and —$R^{4a}$-$R^{5a}$— are independently a $(C_1$-$C_{20})$hydrocarbylene group, a $(C_1$-$C_{20})$heterohydrocarbylene group, or a $(C_1$-$C_{20})$organoheterylene group. $R^3$ may be absent; alternatively $R^3$ is H, a halogen atom, a $(C_1$-$C_{20})$hydrocarbyl group, a $(C_1$-$C_{20})$ heterohydrocarbyl group, or a $(C_1$-$C_{20})$organoheteryl group. $R^3$ is absent if, for example, L is O, H, or an alkyl group. $R^4$ and $R^5$ may be a $(C_1$-$C_{20})$alkyl group, a $(C_6$-$C_{20})$aryl group, a substituted $(C_6$-$C_{20})$aryl group, a $(C_3$-$C_{20})$cycloalkyl group, a substituted $(C_3$-$C_{20})$cycloalkyl group, a $(C_8$-$C_{20})$ bicyclic aralkyl group, or a substituted $(C_8$-$C_{20})$bicyclic aralkyl group. $R^6$ and $R^7$ may be H or absent. R* may be absent, or may be a hydrogen, a Group 14 atom containing group, a halogen, or a heteroatom containing group.

In some aspects the bimodal catalyst system may comprise a combination of a metallocene catalyst compound and a non-metallocene catalyst compound. The metallocene catalyst compound may be a metallocene ligand-metal complex such as a metallocene ligand-Group 4 metal complex, which may be made by activating (with the activator) a procatalyst compound selected from (pentamethylcyclopentadienyl)(n-propylcyclopentadienyl)zirconium dichloride, bis(n-butylcyclopentadienyl)zirconium dichloride, (pentamethylcyclopentadienyl)(n-propylcyclopentadienyl)zirconium dimethyl, and bis(n-butylcyclopentadienyl)zirconium dimethyl. The non-metallocene catalyst compound may be a non-metallocene ligand-metal complex such as a non-metallocene ligand-Group 4 metal complex, which may be made by activating (with the activator) a procatalyst compound selected from bis(2-(2,4,6-trimethylphenylamido)ethyl)amine zirconium dibenzyl and bis(2-(pentamethylphenylamido)ethyl)amine zirconium dibenzyl.

In some aspects the bimodal catalyst system may be made by activating, according to the method of contacting with an activator, a combination of a metallocene procatalyst compound that is (tetramethylcyclopentadienyl)(n-propylcyclopentadienyl)zirconium dichloride and a non-metallocene procatalyst compound that is bis(2-pentamethylphenylamido)ethyl)amine zirconium dibenzyl. The (tetramethylcyclopentadienyl)(n-propylcyclopentadienyl)zirconium dichloride is a compound of formula (II) wherein M is Zr, each X is Cl, $R^6$ is propyl ($CH_2CH_2CH_3$), and each of $R^1$ to $R^4$ is methyl. The bis(2-pentamethylphenylamido)ethyl)amine zirconium dibenzyl is a procatalyst compound of formula (A) wherein M is Zr, each X is benzyl, $R^1$ and $R^2$ are each $CH_2CH_2$; $R^3$ is H; L, Y, and Z are all N; and $R^4$ and $R^5$ are each pentamethylphenyl; and $R^6$ and $R^7$ are absent.

Each of the catalyst compounds of the bimodal catalyst system independently may be unsupported, alternatively supported on a support material, in which latter case the bimodal catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

In some aspects the bimodal catalyst system is the bimodal catalyst system described in any one of the following references: U.S. Pat. Nos. 7,193,017 B2; 7,312,279 B2; 7,858,702 B2; 7,868,092 B2; 8,202,940 B2; and 8,378,029 B2 (e.g., column 4/line 60 to column 5/line 10 and column 10/lines 6 to 38 and Example 1).

The bimodal catalyst system may be fed into the polymerization reactor(s) in "dry mode" or "wet mode", alternatively dry mode, alternatively wet mode. The dry mode is fed in the form of a dry powder or granules. The wet mode is fed in the form of a suspension of the bimodal catalyst system in an inert liquid such as mineral oil. The bimodal catalyst system is commercially available under the PRODIGY™ Bimodal Catalysts brand, e.g., BMC-200, from Univation Technologies, LLC.

($C_3$-$C_{20}$)alpha-olefin. A compound of formula (I): $H_2C=C(H)-R$ (I), wherein R is a straight chain ($C_1$-$C_{18}$) alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. The ($C_3$-$C_{20}$)alpha-olefin is used as a comonomer from which the comonomeric units of the LMW polyethylene component are derived may be the same as, alternatively different than, the($C_3$-$C_{20}$)alpha-olefin from which the comonomeric units of the HMW polyethylene component are derived.

Consisting essentially of, consist(s) essentially of, and the like. Partially-closed ended expressions that exclude anything that would affect the basic and novel characteristics of that which they describe, but otherwise allow anything else. As applied to the description of a bimodal catalyst system embodiment consisting essentially of bis(2-pentamethylphenylamido)ethyl)amine zirconium dibenzyl and (tetramethylcyclopentadienyl)(n-propylcyclopentadienyl)zirconium dichloride, both disposed on a solid support and activated with an activating agent, the expression means the embodiment does not contain a Ziegler-Natta catalyst or any organic ligand other than the bis(2-pentamethylphenylamido)ethyl)amine, benzyl, tetramethylcyclopentadienyl, and n-propylcyclopentadienyl ligands. One or more of the benzyl and chloride leaving groups may be absent from the Zr in the bimodal catalyst system. The expression "consisting essentially of" as applied to the description of the "trim solution means the trim solution is unsupported (i.e., not disposed on a particulate solid) and is free of a Ziegler-Natta catalyst or any organic ligand other than the tetramethylcyclopentadienyl and n-propylcyclopentadienyl ligands. The expression "consist essentially of" as applied to a dry inert purge gas means that the dry inert purge gas is free of, alternatively has less than 5 parts per million based on total parts by weight of gas of water or any reactive compound that could oxidize a constituent of the present polymerization reaction. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

(Co)polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive bimodal PE composition.

At least one, alternatively each of the (co)polymerizing conditions may be fixed (i.e., unchanged) during production of the inventive bimodal PE composition. Such fixed (co) polymerizing conditions may be referred to herein as steady-state (co)polymerizing conditions. Steady-state (co)polymerizing conditions are useful for continuously making embodiments of the inventive bimodal PE composition having same polymer properties.

Alternatively, at least one, alternatively two or more of the (co)polymerizing conditions may be varied within their defined operating parameters during production of the inventive bimodal PE composition in order to transition from the production of a first embodiment of the inventive bimodal PE composition having a first set of polymer properties to a non-inventive bimodal PE composition or to a second embodiment of the inventive bimodal PE composition having a second set of polymer properties, wherein the first and second sets of polymer properties are different and are each within the limitations described herein for the inventive bimodal PE composition. For example, all other (co)polymerizing conditions being equal, a higher molar ratio of ($C_3$-$C_{20}$)alpha-olefin comonomer/ethylene feeds in the inventive method of copolymerizing produces a lower density of the resulting product inventive bimodal PE composition. At a given molar ratio of comonomer/ethylene, the molar ratio of the procatalyst of the trim solution relative to total moles of catalyst compounds of the bimodal catalyst system may be varied to adjust the density, melt index, melt flow, molecular weight, and/or melt flow ratio thereof. To illustrate an approach to making transitions, perform one of the later described inventive copolymerization examples to reach steady-state (co)polymerizing conditions. Then change one of the (co)polymerizing conditions to begin producing a new embodiment of the inventive bimodal PE composition. Sample the new embodiment, and measure a property thereof. If necessary, repeat the change condition/sample product/measure property steps at intervals until the measurement shows the desired value for the property is obtained. An example of such varying of an operating parameter includes varying the operating temperature within the aforementioned range from 83° to 87° C. such as by changing from a first operating temperature of 85° C. to a second operating temperature of 86° C., or by changing from a third operating temperature of 87° C. to a third operating temperature of 85° C. Similarly, another example of varying an operating parameter includes varying the molar ratio of molecular hydrogen to ethylene (H2/C2) from 0.017 to 0.018, or from 0.020 to 0.019. Similarly, another example of varying an operating parameter includes varying the molar ratio of comonomer (Comer) to the ethylene (Comer/C2 molar ratio) from 0.028 to 0.038, or from 0.041 to 0.025. Combinations of two or more of the foregoing example variations are included herein. Transitioning from one set to another set of the (co)polymerizing conditions is permitted within the meaning of "(co)polymerizing conditions" as the operating parameters of both sets of (co)polymerizing conditions are within the ranges defined therefore herein. A beneficial consequence of the foregoing transitioning is that any described property value for the inventive bimodal PE composition, or the LMW or HMW polyethylene component thereof, may be achieved by a person of ordinary skill in the art in view of the teachings herein.

The (co)polymerizing conditions may further include a high pressure, liquid phase or gas phase polymerization reactor and polymerization method to yield the inventive bimodal PE composition. Such reactors and methods are generally well-known in the art. For example, the liquid phase polymerization reactor/method may be solution phase or slurry phase such as described in U.S. Pat. No. 3,324,095. The gas phase polymerization reactor/method may employ the induced condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other gas phase processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The (co)polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, CFCl3, trichloroethane, and difluorotetrachloroethane. Scavenging agents may be a trialkylaluminum. Slurry or gas phase polymerizations may be operated free of (not deliberately added) scavenging agents. The (co)polymerizing conditions for gas phase reactors/polymerizations may further include an amount (e.g., 0.5 to 200 ppm based on all feeds into reactor) static control agents and/or continuity additives such as aluminum stearate or polyethyleneimine. Static control agents may be added to the gas phase reactor to inhibit formation or buildup of static charge therein.

The (co)polymerizing conditions may further include using molecular hydrogen to control final properties of the LMW and/or HMW polyethylene components or inventive bimodal PE composition. Such use of $H_2$ is generally described in Polypropylene Handbook 76-78 (Hanser Publishers, 1996). All other things being equal, using hydrogen can increase the melt flow rate or melt index thereof, which are influenced by the concentration of hydrogen. A molar ratio of hydrogen to total monomer ($H_2$/monomer), hydrogen to ethylene ($H_2$/$C_2$), or hydrogen to comonomer ($H_2$/α-olefin) may be from 0.0001 to 10, alternatively 0.0005 to 5, alternatively 0.001 to 3, alternatively 0.001 to 0.10.

The (co)polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Dry. Generally, a moisture content from 0 to less than 5 parts per million based on total parts by weight. Materials fed to the polymerization reactor(s) during a polymerization reaction under (co)polymerizing conditions typically are dry.

Ethylene. A compound of formula $H_2C\!\!=\!\!CH_2$. A polymerizable monomer.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: for claiming, measure properties on 25 micrometers thick monolayer films.

Higher molecular weight (HMW). Relative to LMW, having a higher weight average molecular weight ($M_w$). The HMW polyethylene component of the inventive bimodal PE composition may have an $M_w$ from 10,000 to 1,000,000 g/mol. The lower endpoint of the $M_w$ for the HMW polyethylene component may be 100,000, alternatively 200,000 g/mol, alternatively 300,000 g/mol. The upper endpoint of $M_w$ may be 900,000, alternatively 600,000, alternatively 400,000 g/mol. In describing the inventive bimodal PE composition, the bottom portion of the range of $M_w$ for the HMW polyethylene component may overlap the upper portion of the range of $M_w$ for the LMW polyethylene component, with the proviso that in any embodiment of the inventive bimodal PE composition the particular $M_w$ for the HMW polyethylene component is greater than the particular $M_w$ for the LMW polyethylene component. The HMW polyethylene component may be made with catalyst prepared by activating a non-metallocene ligand-Group 4 metal complex.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Induced condensing agent (ICA). An inert liquid useful for cooling materials in the polymerization reactor(s) (e.g., a fluidized bed reactor). In some aspects the ICA is a ($C_5$-$C_{20}$)alkane, alternatively a ($C_{11}$-$C_{20}$)alkane, alternatively a ($C_5$-$C_{10}$)alkane. In some aspects the ICA is a ($C_5$-$C_{10}$)alkane. In some aspects the ($C_5$-$C_{10}$)alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %. The use of ICA is optional. In some aspects, including some of the inventive examples described later, an ICA is used. For example, in aspects of the method of making a mixture of ICA and catalyst may be fed into a polymerization reactor. In other aspects of the method, use of ICA may be omitted, and a mixed pre-formulated dry catalyst may be fed as such into the polymerization reactor, which lacks ICA.

Lower molecular weight (LMW). Relative to HMW, having a lower weight average molecular weight ($M_w$). The LMW polyethylene component of the inventive bimodal PE composition may have an $M_w$ from 3,000 to 100,000 g/mol. The lower endpoint of the $M_w$ for the LMW polyethylene component may be 5,000, alternatively 8,000, alternatively 10,000, alternatively 11,000 g/mol. The upper endpoint of $M_w$ may be 50,000, alternatively 40,000, alternatively 30,000, alternatively 20,000 g/mol. The LMW polyethylene component may be made with catalyst prepared by activating a metallocene ligand-Group 4 metal complex.

Polyethylene. A macromolecule, or collection of macromolecules, composed of repeat units wherein 50 to 100 mole percent (mol %), alternatively 70 to 100 mol %, alternatively 80 to 100 mol %, alternatively 90 to 100 mol %, alternatively 95 to 100 mol %, alternatively any one of the foregoing ranges wherein the upper endpoint is <100 mol %, of such repeat units are derived from ethylene monomer, and, in aspects wherein there are less than 100 mol % ethylenic repeat units, the remaining repeat units are comonomeric units derived from at least one ($C_3$-$C_{20}$)alpha-olefin; or collection of such macromolecules. Linear medium density polyethylene (PE). The macromolecule having a substantially linear structure.

Procatalyst. Also referred to as a precatalyst or catalyst compound (as opposed to active catalyst compound), generally a material, compound, or combination of compounds that exhibits no or extremely low polymerization activity (e.g., catalyst efficiency may be from 0 or <1,000) in the absence of an activator, but upon activation with an activator yields a catalyst that shows at least 10 times greater catalyst efficiency than that, if any, of the procatalyst.

Resolved (GPC chromatogram). A molecular weight distribution having two peaks separated by an intervening local minimum. For example, a resolved GPC chromatogram of the inventive polymers represented by a plot of dW/d log(MW) versus log(MW) that features local maxima dW/d log(MW) values for the LMW and HMW polyethylene component peaks, and a local minimum dW/d log(MW) value at a log(MW) between the maxima. The at least some separation of the peaks for the LMW and HMW polyethylene components in the chromatogram of the GPC. Typically the separation may not be down to baseline.

Start-up or restart of the polymerization reactor(s) illustrated with a fluidized bed reactor. The start-up of a recommissioned fluidized bed reactor (cold start) or restart of a transitioning fluidized bed reactor (warm start/transition) includes a time period that is prior to reaching the (co) polymerizing conditions. Start-up or restart may include the use of a seedbed preloaded or loaded, respectively, into the fluidized bed reactor. The seedbed may be composed of powder of polyethylene. The polyethylene of the seedbed may be a MDPE, alternatively a PE, alternatively a bimodal PE, alternatively a previously made embodiment of the inventive bimodal PE composition.

Start-up or restart of the fluidized bed reactor may also include gas atmosphere transitions comprising purging air or other unwanted gas(es) from the reactor with a dry (anhydrous) inert purge gas, followed by purging the dry inert purge gas from the reactor with dry ethylene gas. The dry inert purge gas may consist essentially of molecular nitrogen ($N_2$), argon, helium, or a mixture of any two or more thereof. When not in operation, prior to start-up (cold start), the fluidized bed reactor contains an atmosphere of air. The dry inert purge gas may be used to sweep the air from a recommissioned fluidized bed reactor during early stages of start-up to give a fluidized bed reactor having an atmosphere consisting of the dry inert purge gas. Prior to restart (e.g., after a change in seedbeds or prior to a change in alpha-olefin comonomer), a transitioning fluidized bed reactor may contain an atmosphere of unwanted alpha-olefin, unwanted ICA or other unwanted gas or vapor. The dry inert purge gas may be used to sweep the unwanted vapor or gas from the transitioning fluidized bed reactor during early stages of restart to give the fluidized bed reactor having an atmosphere consisting of the dry inert purge gas. Any dry inert purge gas may itself be swept from the fluidized bed reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the fluidized bed reactor to the reaction temperature of the (co)polymerizing conditions.

Start-up or restart of the fluidized bed reactor also includes introducing feeds of reactants and reagents thereinto. The reactants include the ethylene and the alpha-olefin. The reagents fed into the fluidized bed reactor include the molecular hydrogen gas and, optionally, the induced condensing agent (ICA) and the mixture of the bimodal catalyst system and the trim solution.

Trim solution. Any one of the metallocene procatalyst compounds or the non-metallocene procatalyst compounds described earlier dissolved in the inert liquid solvent (e.g., liquid alkane). The trim solution is mixed with the bimodal catalyst system to make the mixture, and the mixture is used in the inventive polymerization reaction to modify at least one property of the inventive bimodal PE composition made thereby. Examples of such at least one property are density, melt index $I_2$, flow index $I_{21}$, melt flow ratio $(I_{21}/I_2)$, and molecular mass dispersity $(M_w/M_n)$, $Ð_M$. The mixture of the bimodal catalyst system and the trim solution may be fed into the polymerization reactor(s) in "wet mode", alternatively may be devolatilized and fed in "dry mode". The dry mode is fed in the form of a dry powder or granules. When mixture contains a solid support, the wet mode is fed in the form of a suspension or slurry. In some aspects the inert liquid is a liquid alkane such as heptane.

Ziegler-Natta catalysts. Heterogeneous materials that enhance olefin polymerization reaction rates and typically are products that are prepared by contacting inorganic titanium compounds, such as titanium halides supported on a magnesium chloride support, with an activator. The activator may be an alkylaluminum activator such as triethylaluminum (TEA), triisobutylaluminum (TIBA), diethylaluminum chloride (DEAC), diethylaluminum ethoxide (DEAE), or ethylaluminum dichloride (EADC).

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

The following apply unless indicated otherwise. Alternatively precedes a distinct embodiment. ASTM means the standards organization, ASTM International, West Conshohocken, Pennsylvania, USA. IEC means the standards organization, International Electrotechnical Commission, Geneva, Switzerland. ISO means the standards organization, International Organization for Standardization, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substituted when referring to a compound means having, in place of hydrogen, one or more substituents, up to and including per substitution.

Bimodality Test Method: determine presence or absence of resolved bimodality by plotting dWf/d Log M (mass detector response) on y-axis versus Log M on the x-axis to obtain a GPC chromatogram curve containing local maxima log(MW) values for LMW and HMW polyethylene component peaks, and observing the presence or absence of a local minimum between the LMW and HMW polyethylene component peaks. The dWf is change in weight fraction, d Log M is also referred to as d Log(MW) and is change in logarithm of molecular weight, and Log M is also referred to as Log(MW) and is logarithm of molecular weight.

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the inventive bimodal PE composition by using summed values of the weight fractions (Wf) of the LMW and HMW polyethylene components and the respective number average molecular weights $(M_n)$ and weight average molecular weights $(M_w)$ by known mathematical treatment of aggregated Schulz-Flory MW distributions.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Environmental Stress Crack Resistance (ESCR) F50 Test Method: measured according to ASTM D1693-15, *Standard Test Method for Environmental Stress-Cracking of Ethylene Plastics*, Method B. Igepal CO-630 is used at 10 wt % in water at 50° C. Igepal CO-630 (CAS No. 68412-54-4) is a polyoxyethylene nonylphenyl ether, branched, wherein the polyoxyethylene is of linear formula $(C_2H_4O)_n$, wherein subscript m is on average from 9 to 10; and has a number average molecular weight of 617 g/mol. Testing is carried out on 10 (or more) molded specimens having a thickness of either 0.32 cm (⅛ inch) or 1.94 cm (¾ inch), a length of 3.81 cm (1.5 inch), and width of 1.27 cm (0.5 inch). The thickness of each specimen is 0.191 cm (0.075 inch), as per ASTM D1693-15, Method B. The length defines a long axis of the test specimen. Using a mounted razor blade, a surface cut of specified length and depth is made on the test specimen parallel to its long axis. The resulting cut specimens are then stressed by being bent at 180 degrees, and then the bent specimens are placed in a rack that is immersed in a test tube containing the 10 wt % Igepal CO-630 in water at 50° C. Periodically the immersed specimens are visually inspected for cracks perpendicular to the cuts, and the number of failures (the number of test specimens having perpendicular cracks) is recorded. The test failure point is when half of the total number of test specimens shows cracking in direction perpendicular to the cuts. The length of time in hours that has elapsed from initial immersion to the test failure point is recorded as the ESCR F50.

Flow Index (190° C., 5.0 kg, "I$_5$") Test Method: use ASTM D1238-13, *Standard Test Method for Melt Flow Rates of Thermoplastics by Extrusion Platometer*, using conditions of 190° C./5.0 kilograms (kg). Report results in units of grams eluted per 10 minutes (g/10 min.) or the equivalent in decigrams per 1.0 minute (dg/1 min.).

High-Load Flow Index (190° C., 21.6 kg, "I$_{21}$") Test Method: use ASTM D1238-13, *Standard Test Method for Melt Flow Rates of Thermoplastics by Extrusion Platometer*, using conditions of 190° C./21.6 kg. Report results in units of grams eluted per 10 minutes (g/10 min.) or the equivalent in decigrams per 1.0 minute (dg/1 min.).

Gel permeation chromatography (GPC) Method: Weight-Average Molecular Weight Test Method: determine $M_w$, number average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}=0.67$, $K_{PS}=0.000175$, and $a_x$ and $K_x$ are obtained from published literature. For polyethylenes, $a_x/K_x=0.695/0.000579$. For polypropylenes $a_x/K_x=0.705/0.0002288$. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, /indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

Long Chain Branching (LCB) Test Method: calculate number of long chain branches (LCB) per 1,000 carbon atoms of a test polymer using a correlation developed by Janzen and Colby (*J. Mol. Struct.*, 485/486, 569-584 (1999)) between zero shear viscosity, $\eta_o$, and $M_w$. Their correlation is drawn as a reference line on a reference graph of $\eta_o$ on the y-axis and $M_w$ on the x-axis. Then a test polymer is characterized by (a) and (b): (a) using the Zero Shear Viscosity Determination Method described later, measuring the test polymer's small-strain (10%) oscillatory shear, and using a three parameter Carreau-Yasuda empirical model ("CY Model") to determine values for $\eta_o$ therefrom; and (b) using the GPC Test Method described earlier, measuring the test polymer's $M_w$. Plot the results for the test polymer's $\eta_o$ and $M_w$ on the reference graph, and compare them to the reference line. Results for test polymers with zero (0) long chain branching per 1,000 carbon atoms will plot below the Janzen and Colby reference line, whereas results for test polymers having long chain branching >0 per 1,000 carbon atoms will plot above the Janzen and Colby reference line. The CY Model is well-known from R. B. Bird, R. C. Armstrong, & O. Hasseger, *Dynamics of Polymeric Liquids*, Volume 1, *Fluid Mechanics*, 2$^{nd}$ Edition, John Wiley & Sons, 1987; C. A. Hieber & H. H. Chiang, Rheol. Acta, 1989, 28: 321; and C. A. Hieber & H. H. Chiang, *Polym. Eng. Sci.*, 1992, 32: 931.

Melt Flow Ratio (190° C., "I$_{21}$/I$_2$") Test Method: calculated by dividing the value from the Flow Index I$_{21}$ Test Method by the value from the Melt Index I$_2$ Test Method.

Melt Index (190° C., 2.16 kilograms (kg), "I$_2$") Test Method: for ethylene-based (co)polymer is measured according to ASTM D1238-13, using conditions of 190° C./2.16 kg, formerly known as "Condition E" and also known as I$_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

Oxidative Induction Time (OIT) Test Method (O$_2$, 210° C.): Measures the time required to initiate oxidation of a test sample of a polyolefin composition, made by the Compression Molded Plaque Preparation Method, under molecular oxygen atmosphere at 210° C. in a differential scanning calorimeter (DSC). Used TA Instruments Thermal Analysis Q-1000 DSC unit equipped with a Module DSC Standard Cell. Cut approximately 2 mg of test sample into thin slices using a razor blade. Placed sliced test sample into an open aluminum DSC pan. Equilibrated pan/contents at 60° C. for 5 minutes under nitrogen gas flowing at 50 milliliters per minute (mL/min.). Then under nitrogen gas raised the temperature at 20° C./min. to 210° C., and held at 210° C. for 5 minutes under nitrogen. Then switched the gas over to molecular oxygen, also at a flow rate of 50 mL/min., and recorded the elapsed time in minutes from when the oxygen gas was switched on (Time 0) to the onset of a significant exothermic peak in DSC as the oxidative induction time or OIT (O$_2$, 210° C.). The longer the elapsed time to OIT (O$_2$, 210° C.), the more resistant to oxidative heat aging the test sample.

Shrinkage: measured by ASTM D-955 using a 60 mm×60 mm×2 mm plaques.

Spiral Flow Length Test Method: perform spiral flow length measurements by molding a polymer sample on an injection molding machine into a spiral flow mold having thickness of 0.127 centimeter (cm, 0.05 inch), at the melt temperature of 260° C. and a mold temperature of 26° C. under the injection pressures of 68.95 MPa (10,000 psi), 103.4 MPa (15,000 psi) and 137.9 MPa (20,000 psi). Measure the flow length of the polymer into the mold in centimeters. Calculate a mean from five values at each pressure setting for each polymer molded. The spiral flow of a thermosetting molding compound is a measure of its combined characteristics of fusion under pressure, melt viscosity, and gelation rate under the specified conditions.

Zero Shear Viscosity Determination Method: perform small-strain (10%) oscillatory shear measurements on polymer melts at 190° C. using an ARES-G2 Advanced Rheometric Expansion System, from TA Instruments, with parallel-plate geometry to obtain complex viscosity $|\eta^*|$ versus frequency ($\omega$) data. Determine values for the three parameters—zero shear viscosity, $\eta_o$, characteristic viscous relaxation time, $\tau_\eta$, and the breadth parameter, a,—by curve fitting the obtained data using the following CY Model:

$$|\eta^*(\omega)| = \frac{\eta^o}{[1 + (\tau_\eta \omega)^a]^{\frac{(1-n)}{a}}},$$

wherein $|\eta^*(\omega)|$ is magnitude of complex viscosity, $\eta_o$ is zero shear viscosity, $\tau_\eta$ is viscous relaxation time, a is the breadth parameter, n is power law index, and $\omega$ is angular frequency of oscillatory shear.

Bimodal catalyst system 1: consisted essentially of or made from bis(2-pentamethylphenylamido)ethyl)amine zirconium dibenzyl and (tetramethylcyclopentadienyl)(n-propylcyclopentadienyl)zirconium dichloride spray-dried in a 3:1 molar ratio onto CAB-O-SIL TS610, a hydrophobic fumed silica made by surface treating hydrophilic (untreated) fumed silica with dimethyldichlorosilane support, and methylaluminoxane (MAO), and fed into a gas phase polymerization reactor as a slurry in mineral oil. The molar ratio of moles MAO to (moles of bis(2-pentamethylphenylamido)ethyl)amine zirconium dibenzyl+moles (tetramethylcyclopentadienyl)(n-propylcyclopentadienyl)zirconium dichloride) was 140:1.

Comonomer 1: 1-Hexene, used at a molar ratio of 1-hexene/C2 in Table 1.

Ethylene ("02"): partial pressure of C2 was maintained as described later in Table 1.

Induced condensing agent 1 ("ICA1"): isopentane, used at a mole percent (mol %) concentration in the gas phase of a gas phase reactor relative to the total molar content of gas phase matter. Reported later in Table 1.

Molecular hydrogen gas ("H2"): used at a molar ratio of H2/C2 in Table 1.

Trim solution 1: consisted essentially of or made from (tetramethylcyclopentadienyl)(n-propylcyclopentadienyl) zirconium dimethyl (procatalyst) dissolved in heptane to give a solution having a concentration of 0.7 gram procatalyst per milliliter solution (g/mL).

Inventive Examples 1 and 2 (IE1 & IE2): Produced the bimodal PE composition of IE1 in a single gas phase polymerization reactor containing a pilot plant scale continuous mode, gas phase fluidized bed reactor with a capacity of producing 22 to 110 kg resin per hour. For an experimental run, preloaded the reactor before startup with a seedbed of granular resin inside. Dried down the reactor with the seedbed below 5 ppm moisture with high purity nitrogen. Then introduced reaction constituent gases to the reactor to build a gas phase condition. At the same time heated the reactor up to the desired temperature. Charged the reactor with hydrogen gas sufficient to produce a molar ratio of hydrogen to ethylene of 0.004 at the reaction conditions, and charged the reactor with 1-hexene to produce a molar ratio of 1-hexene to ethylene of 0.008 (IE1) or 0.010 (IE2) at reaction conditions. Pressurized the reactor with ethylene (total pressure=220 psi) and kept the temperature at 95° C. Once the (co)polymerizing conditions were reached, injected a feed of a slurry of Bimodal Catalyst System1 into the reactor. Meanwhile mixed a trim solution feed with the feed of Bimodal Catalyst System1 to give a mixture thereof, which is then fed into the reactor, wherein mixing was done at varying molar ratios ranging from 1.5 to 2.5 ($Zr_{catalyst}$/$Zr_{trim}$, mol/mol) to fine tune flow index and melt index of inventive bimodal polyethylene composition to desired target values. Used about three bed turnovers to reach steady-state production of the bimodal polyethylene, thereby giving the embodiment of the inventive bimodal PE composition (product) of IE1 or IE2, respectively. Collected the inventive bimodal PE composition of IE1 or IE2 from the reactor's product discharge outlet and characterized its properties. Operating constituents and parameters are summarized below in Table 1. Properties of the product inventive bimodal PE composition of IE1 and IE2 are summarized later in Table 2. Densities of the LMW component and the HMW component cannot be measured directly. Estimates within about ±0.005 g/cm$^3$ of the densities of the LMW component and the HMW component based on kinetic models developed from historical data have been made, but are not reported.

TABLE 1

Operating constituents/parameters for Inventive Example IE1 and IE2.

| Reaction Constituent/Parameter | (co)polymerizing condition |
| --- | --- |
| Reactor | single, continuous-mode, fluidized bed |
| Starting seedbed = granular PE resin | Preloaded in reactor |
| Reactor Purging method | Anhydrous N$_2$ gas |
| Ethylene ("C2") | 1517 kPa partial pressure |
| Comonomer = 1-hexene | molar ratio of 1-hexene/C2 = 0.008 (IE1), 0.010 (IE2) |
| Molecular hydrogen gas ("H2") | molar ratio of H2/C2 = 0.004 |
| Induced condensing agent 1: isopentane | 6.93 mol % (IE1), 6.91 mol % (IE2) |
| Operating temperature | 95° C. |
| Bed weight | 35.4 kg (IE1), 35.5 kg (IE2) |
| Superficial gas velocity (SGV, meters/second) | 0.55 m/s |

TABLE 2 properties of inventive bimodal PE composition of IE1 and IE2.

| Polymer Property Measured | IE1 Result | IE2 Result |
|---|---|---|
| Composition Density (ASTM D792-13) | 0.955 g/cm3 | 0.9545 g/cm3 |
| Composition Melt Index $I_2$ (190° C., 2.16 kg, ASTM D1238-04) | 0.529 g/10 min. | 1.06 g/10 min. |
| Composition Flow Index $I_5$ (190° C., 5.0 kg, ASTM D1238-04) | 2.9 g/10 min. | 7.0 g/10 min. |
| Composition High-Load Flow Index $I_{21}$ (190° C., 21.6 kg, ASTM D1238-04) | 119 g/10 min. | 287 g/10 min. |
| Composition Melt Flow Ratio (I21/I2) | 225 | 271 |
| Composition Number-average molecular weight (Mn) | 8,381 g/mol | 7,690 g/mol |
| Composition Weight-average molecular weight (Mw) | 181,577 g/mol | 151,113 g/mol |
| Composition Molecular mass dispersity (Mw/Mn), $Đ_M$ | 21.67 | 19.65 |
| Resolved Bimodality (GPC local minimum) | Yes, at 4.8 LogM | Yes, at 4.8 LogM |
| LMW Polyethylene Component Conc. (wt %) | 65 | 71 |
| HMW Polyethylene Component Conc. (wt %) | 35 | 29 |
| LMW Polyethylene Component Mn (g/mol) | 5,089 | 5,097 |
| LMW Polyethylene Component Mw (g/mol) | 13,074 | 13,285 |
| LMW Polyethylene Component Molecular mass dispersity (Mw/Mn), $Đ_M$ | 2.57 | 2.61 |
| HMW Polyethylene Component Mn (g/mol) | 121,000 | 121,500 |
| HMW Polyethylene Component Mw (g/mol) | 495,728 | 484,797 |
| HMW Polyethylene Component Molecular mass dispersity (Mw/Mn), $Đ_M$ | 4.1 | 3.99 |
| Long Chain Branching (LCB) Index | No LCB detected | No LCB detected |
| DSC OIT at 210° C. | 63.6 min | 60.6 min |
| ESCR F50 (10% Igepal at 50° C.) | >1000 hours | 718 |
| *Spiral Flow Length at 68.95 MPa (cm) | 29.2 | 34.93 |
| *Spiral Flow Length at 103.4 MPa (cm) | 38.74 | 45.7 |
| *Spiral Flow Length at 137.9 MPa (cm) | 47.63 | 55.9 |

Figure 2:
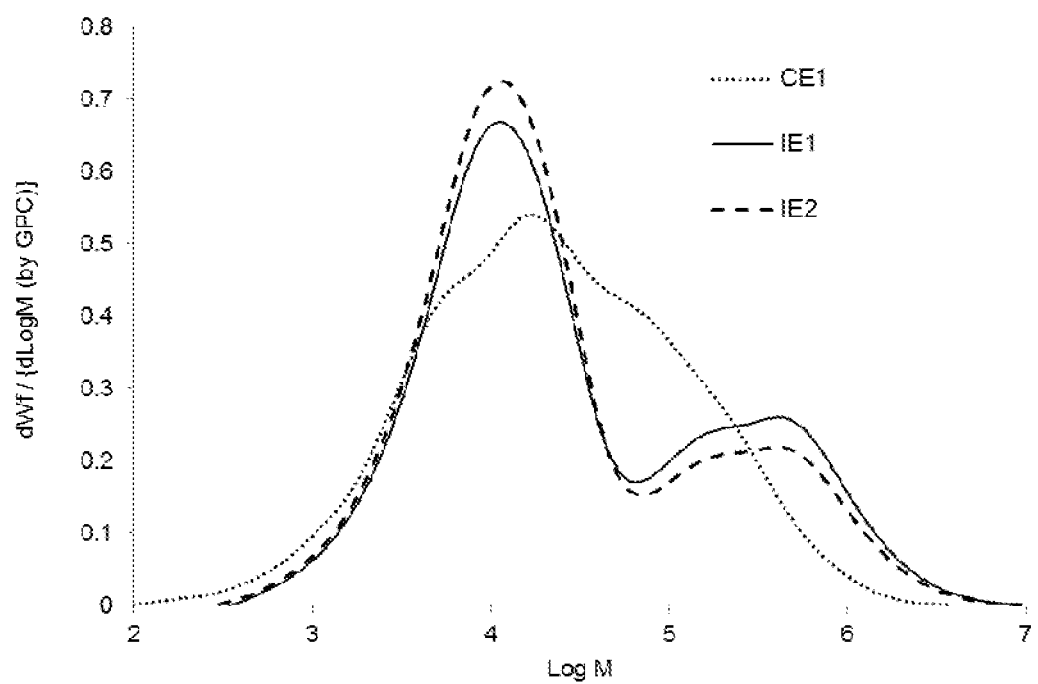
FIG. 2 is a GPC chromatogram of inventive examples 1 and 2 of the inventive bimodal PE composition and a comparative composition.

The resolved bimodalities of the inventive bimodal PE composition of IE1 and IE2 are shown in FIG. 2 in comparison to that of the comparative composition, DMDC-1250 from The Dow Chemical Company, which comparative composition is monomodal.

Advantageously we discovered the inventive bimodal PE composition has melt properties (e.g., $I_2$, $I_5$, $I_{21}$, $I_{21}/I_2$, $I_{21}/I_5$) and low shrinkage values in flow direction or cross-flow direction that enable manufacturing of bottle caps or closures by injection molding methods. Also, the inventive bimodal PE composition has suitable composition properties (e.g., density, Mw, Mn, Mw/Mn, and a resolved bimodality), suitable HMW polyethylene component properties (density, Mw, Mn, and Mw/Mn), and suitable LMW polyethylene component properties (density, Mw, Mn, and Mw/Mn), that beneficially give high spiral flow index values, long time periods before observation in DSC of oxidative induction time, and long time periods before failure in ESCR.

The invention claimed is:

1. A bimodal polyethylene composition comprising a lower molecular weight (LMW) polyethylene component and a higher molecular weight (HMW) polyethylene component, wherein each of the LMW and HMW polyethylene components comprises ethylene-derived monomeric units and ($C_3$-$C_{20}$)alpha-olefin-derived comonomeric units; and wherein the bimodal polyethylene composition is characterized by each of limitations (a) to (e): (a) a resolved bimodality (resolved molecular weight distribution) showing in a chromatogram of gel permeation chromatography (GPC) of the bimodal polyethylene composition, wherein the chromatogram shows a peak representing the HMW polyethylene component, a peak representing the LMW polyethylene component, and a local minimum in a range of Log(molecular weight) ("Log(MW)") 3.5 to 5.5 between the Log (MW) peak representing the HMW polyethylene component and the Log(MW) peak representing the LMW polyethylene component, measured according to Bimodality Test Method; (b) a density from 0.950 to 0.960 g/cm$^3$, measured according to ASTM D792-13 Method B; (c) a melt index (I2) of from 0.5 to 1.5 g/10 min., measured according to ASTM D1238-13 (190° C., 2.16 kg); (d) a melt flow ratio ($I_{21}/I_2$) of from 150 to 300, wherein $I_2$ is measured as above and $I_{21}$ is flow index measured according to ASTM D1238-13 (190° C., 21.6 kg); (e) a flow index (Is) from 2.0 to 10.0 g/10 min., measured according to ASTM D1238-13 (190° C., 5.0 kg); and wherein the HMW polyethylene component of the bimodal polyethylene composition is characterized by limitations (f) and (g): (f) a weight-average molecular weight (Mw) of greater than 350,000 grams per mole (g/mol), as measured by Gel Permeation Chromatography Method; and (g) a molecular mass dispersity, $Đ_M$, (Mw/Mn) greater than 3.50.

2. The bimodal PE composition of claim 1 further described by any one of limitations (i) to (vi): (i) a spiral flow length of from 25 to 40 centimeters (cm) measured at 68.95 megapascals (MPa), a spiral flow length from 30 to 60 cm measured at 103.4 MPa, or a spiral flow length from 40 to 70 cm measured at 137.9 MPa according to the Spiral Flow Length Test Method; (ii) an environmental stress crack resistance (ESCR) F50 measured according to ASTM D1693-15 in 10 weight percent (wt %) Igepal CO-630 in water at 50° C. of greater than 500 hours; (iii) a shrinkage from melt to solid form of from 3.0% to 5.0% in flow direction or a shrinkage from melt to solid form of from 0.2% to 1.5% in cross-flow direction, measured according to ASTM D-955 utilizing a 60 mm×60 mm×2 mm plaques; (iv)

an oxidative induction time (OIT) of greater than 40 minutes at 210° C. as measured by differential scanning calorimetry (DSC) according to OIT Test Method; (v) at least two of (i) to (iv); (vi) each of (i) to (iv).

3. The bimodal PE composition of claim 1 further described by any one of limitations (i) to (vii): (i) a molecular mass dispersity ($M_w/M_n$),$Đ_M$ (pronounced Đ-stroke M), from 15 to 30, measured according to Gel Permeation Chromatography (GPC) Test Method; (ii) a weight average molecular weight ($M_n$) of the LMW polyethylene component from 4,000 to 6,000 g/mol and a $M_n$ of the HMW polyethylene component from 110,000 to 130,000 g/mol, measured according to GPC Test Method, after deconvoluting the LMW and HMW polyethylene components of the bimodal PE composition according to Deconvoluting Test Method; (iii) no measurable amount of long chain branching per 1,000 carbon atoms ("LCB Index"), measured according to LCB Test Method; (iv) both (i) and (ii); (v) both (i) and (iii); (vi) both (ii) and (iii); and (vii) each of (i) to (iii).

4. The bimodal PE composition of claim 1 further described by any one of limitations (i) to (iv): (i) the ($C_3$-$C_{20}$)alpha-olefin-derived comonomeric units are derived from 1-butene; (ii) the ($C_3$-$C_{20}$)alpha-olefin-derived comonomeric units are derived from 1-hexene; (iii) the ($C_3$-$C_{20}$)alpha-olefin-derived comonomeric units are derived from 1-octene; and (iv) the ($C_3$-$C_{20}$)alpha-olefin-derived comonomeric units are derived from a combination of any two, alternatively each of 1-butene, 1-hexene, and 1-octene.

5. A method of making the bimodal polyethylene composition of claim 1, the method comprising contacting ethylene (monomer) and at least one ($C_3$-$C_{20}$)alpha-olefin (comonomer) with a mixture of a bimodal catalyst system and a trim solution in the presence of molecular hydrogen gas ($H_2$) and, optionally, an induced condensing agent (ICA) in one, two or more polymerization reactors under (co) polymerizing conditions, thereby making the bimodal polyethylene composition; wherein prior to being mixed together the trim solution consists essentially of a (tetramethylcyclopentadienyl)(n-propylcyclopentadienyl)zirconium complex and an inert liquid solvent and the bimodal catalyst system consists essentially of an activator species, a non-metallocene ligand-Group 4 metal complex and a metallocene ligand-Group 4 metal complex, all disposed on a solid support; and wherein the (co)polymerizing conditions comprise a reaction temperature from 80 degrees (°) to 110° Celsius (C.); a molar ratio of the molecular hydrogen gas to the ethylene (H2/C2 molar ratio) from 0.001 to 0.050; and a molar ratio of the comonomer (Comer) to the ethylene (Comer/C2 molar ratio) from 0.005 to 0.10.

6. A manufactured article comprising a shaped form of the bimodal polyethylene composition of claim 1.

7. The manufactured article of claim 6 selected from: coatings, films, sheets, extruded articles, and injection molded articles.

8. A bottle cap or closure comprising a base member and a skirt member, the base member defining a perimeter edge therearound, and the skirt member being in operative connection to the perimeter edge of the base member and extending axially from the perimeter of the base member; wherein the skirt member defines an inner surface; wherein the base member being for sealing a bottle opening of a bottle and the skirt member being for operatively attaching the bottle cap or closure to an exterior cap-or-closure-receiving portion of the bottle proximate the bottle opening, wherein at least one of the base member and skirt member of the bottle cap or closure is composed of the bimodal polyethylene composition of claim 1.

\* \* \* \* \*

UNITED STATES PATENT AND TRADEMARK OFFICE
CERTIFICATE OF CORRECTION

PATENT NO. : 11,827,725 B2
APPLICATION NO. : 16/976497
DATED : November 28, 2023
INVENTOR(S) : Borse et al.

It is certified that error appears in the above-identified patent and that said Letters Patent is hereby corrected as shown below:

In the Claims

Column 22 Claim 1, Line 40 should read "to ASTM D792-13 Method B; (C) a melt index ($I_2$) of from"

Column 22 Claim 1, Line 45 should read "21.6 kg); (e) a flow index ($I_5$) from 2.0 to 10.0 g/10 min.,"

Signed and Sealed this
Second Day of April, 2024

Katherine Kelly Vidal
Director of the United States Patent and Trademark Office